US008108203B2

(12) United States Patent
Takano et al.

(10) Patent No.: US 8,108,203 B2
(45) Date of Patent: Jan. 31, 2012

(54) TRANSLATION SYSTEM, TRANSLATION PROGRAM, AND BILINGUAL DATA GENERATION METHOD

(75) Inventors: Rikuo Takano, Suginami (JP); Satoshi Shirai, Kizugawa (JP); Kazuyoshi Oshima, Setagaya (JP); Masatoshi Ono, Tsukuba (JP)

(73) Assignees: Funai Electric Advanced Applied Technology Research Institute Inc. (JP); Funai Electric Co., Ltd. (JP)

( * ) Notice: Subject to any disclaimer, the term of this patent is extended or adjusted under 35 U.S.C. 154(b) by 893 days.

(21) Appl. No.: 12/108,134

(22) Filed: Apr. 23, 2008

(65) Prior Publication Data

US 2009/0326915 A1 Dec. 31, 2009

(30) Foreign Application Priority Data

Apr. 23, 2007 (JP) ................. 2007-113272

(51) Int. Cl.
*G06F 17/28* (2006.01)
(52) U.S. Cl. ............. 704/4; 704/2; 704/3; 704/5; 704/7; 704/8
(58) Field of Classification Search .......... 704/4, 2, 704/5, 8, 3, 7
See application file for complete search history.

(56) References Cited

U.S. PATENT DOCUMENTS

| 6,393,388 | B1 | 5/2002 | Franz et al. | |
|---|---|---|---|---|
| 2003/0004702 | A1 | 1/2003 | Higinbotham | |
| 2005/0033567 | A1* | 2/2005 | Sukehiro | 704/8 |
| 2006/0009961 | A1* | 1/2006 | Chan | 704/4 |
| 2007/0016397 | A1* | 1/2007 | Lu et al. | 704/2 |
| 2007/0174040 | A1* | 7/2007 | Liu et al. | 704/2 |

(Continued)

FOREIGN PATENT DOCUMENTS

JP 04-054670 2/1992
(Continued)

OTHER PUBLICATIONS

Gengojohoshori [Language Information Processing] by Makoto Nagao, et al., Iwanami Shoten Publishers, Dec. 2004, pp. 112-113 (with English translation of relevant portions).

(Continued)

*Primary Examiner* — Qi Han
(74) *Attorney, Agent, or Firm* — Harness, Dickey & Pierce, P.L.C.

(57) ABSTRACT

A translation system including: a bilingual data storage section, a plurality of pieces of first language simple sentence data and a plurality of pieces of second language simple sentence data being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence. The target language simple sentence data output section receives first-language-source-language simple sentence data, selects first language simple sentence data from the plurality of pieces of the first language simple sentence data stored in the bilingual data storage section based on the received first-language-source-language simple sentence data, and outputs the second language simple sentence data associated with the selected first language simple sentence data as the target language simple sentence data.

23 Claims, 9 Drawing Sheets

U.S. PATENT DOCUMENTS

2008/0059146 A1* 3/2008 Liu .................................. 704/2

FOREIGN PATENT DOCUMENTS

JP          09-258776      10/1997
WO      WO 01/39036    5/2001

OTHER PUBLICATIONS

Harold Somers, "Review Article: Example-Based Machine Translation", Machine Translation, Kluwer Academic Publishers, Dordrecth, NL, vol. 2, No. 14, XP-001092717, pp. 113-157 (1999).

Takao Doi, et al., "Splitting Input Sentence for Machine Translation using Language Model with Sentence Similarity", Association for Computational Linguistics, Proceedings of the $20^{th}$ International Conference on Computational Linguistics, Geneva, Switzerland, XP-002501254, 7 pages (2004).

Satoshi Shirai, et al., "Towards a Thesaurus of Predicates", Proceedings of the Third International Conference on Language Resources and Evaluation (LREC), Las Palmas, Canary Islands, Spain, XP-002501255, 8 pages (2002).

* cited by examiner

FIG. 3

| FIRST LANGUAGE SIMPLE SENTENCE | SECOND LANGUAGE SIMPLE SENTENCE |
|---|---|
| コーヒーを下さい。 | Coffee, please. |
| お勧めの料理は何ですか。 | Do you have any recommendations? |
| シャツはありますか。 | Do you have shirts? |
| このカードは使えますか。 | Can I use this card? |
| これを試着してもいいですか。 | Can I try this one? |
| あれを見せてください。 | Would you show me that? |
| 空き部屋はありますか。 | Do you have any vacancies? |
| 写真を撮ってください。 | Could you take my picture? |
| タクシー乗り場はどこですか。 | Where is the taxi station? |
| 道に迷いました。 | I am lost. |
| お土産を探しています。 | I am looking for a gift. |
| 風邪をひきました。 | I caught a cold. |
| 風邪薬を下さい。 | Can I have a cold medicine, please? |

FIG. 5

GROUP 1

| | |
|---|---|
| 500 ─ ○風邪をひきました。 | ○I caught a cold. ─ 510 |
| 風邪をひいた。 | I caught a cold. |
| 風邪をひきました。 | I caught a cold. |
| 風邪をひいたようです。 | I caught a cold. |
| 風邪をひいた。 | I caught a cold. |
| 風邪で具合が悪いのです。 | I feel like I'm coming down with a cold. |
| 風邪をひきました。 | I got a cold. |
| 風邪をひいています。 | I have a cold, doctor. |
| 風邪をひいています。 | I have a cold. |
| 風邪をひきました。 | I have a cold. |
| 502 ─ 風邪気味です。 | I have a cold. |
| 風邪を引いた。 | I have a cold. |
| 風邪を引いている。 | I have a cold. |
| 風邪をひいてます。 | I have a cold. |
| 風邪をひきました。 | I have a cold. |
| 風邪を引いています。 | I have a cold. |

GROUP 2

| | |
|---|---|
| 520 ─ ○風邪薬をください。 | ○Can I have a cold medicine, please? ─ 530 |
| 風邪薬が欲しいのですが。 | Can I have some cold medicine? |
| 何かいい風邪薬はありますか。 | Can you suggest something for a cold? |
| 風邪薬をください。 | Cold medicine, please. |
| いい風邪薬がありますか。 | Could you recommend some medicine for a cold? |
| 風邪薬はありますか。 | Do you have any cold medicine? |
| 風邪薬はありますか。 | Do you have anything for a cold? |
| 風邪の薬がほしいのですが。 | Do you have anything for a cold? |
| 風邪に効く薬はありますか。 | Do you have anything for a cold? |
| 風邪薬はありますか。 | Do you have cold medicine? |
| 風邪薬はありませんか。 | Do you have medicine for a cold? |
| 風邪薬はありますか。 | Do you have some cold medicine? |
| 風邪薬が何かありますか。 | Have you got a cold-medicine? |

TRANSLATION SYSTEM, TRANSLATION PROGRAM, AND BILINGUAL DATA GENERATION METHOD

Japanese Patent Application No. 2007-113272, filed on Apr. 23, 2007, is hereby incorporated by reference in its entirety.

BACKGROUND OF THE INVENTION

The present invention relates to a translation system, a translation program, and a bilingual data generation method.

A translation system which translates one language into another language has been studied, and various translation systems have been developed.

However, since a human being disseminates a wide variety of information, it is difficult to achieve highly accurate translation even when using hardware (e.g., computer) with high processing capability or a huge database. As technologies relating to this field, JP-A-9-258776, JP-A-4-54670, Makoto Nagao and four others, *Gengojohoshori [Language Information Processing]* (Iwanami Shoten Publishers, Dec. 3, 2004. 112-113), and the like have been known.

SUMMARY

According to a first aspect of the invention, there is provided a translation system comprising:

a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence, the target language simple sentence data output section receiving first-language-source-language simple sentence data corresponding to a first-language-source-language simple sentence in the first language, and selecting first language simple sentence data from the plurality of pieces of the first language simple sentence data stored in the bilingual data storage section based on the received first-language-source-language simple sentence data; and the target language simple sentence data output section outputting the second language simple sentence data associated with the selected first language simple sentence data as the target language simple sentence data.

According to a second aspect of the invention, there is provided a translation program causing a computer to function as:

a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence, the target language simple sentence data output section receiving first-language-source-language simple sentence data corresponding to the first-language-source-language simple sentence in the first language, and selecting first language simple sentence data from the plurality of pieces of the first language simple sentence data stored in the bilingual data storage section based on the received first-language-source-language simple sentence data; and the target language simple sentence data output section outputting the second language simple sentence data associated with the selected first language simple sentence data as the target language simple sentence data.

According to a third aspect of the invention, there is provided a bilingual data generation method comprising:

providing first-language-second-language bilingual data, the first-language-second-language bilingual data including a plurality of pieces of first language simple sentence data corresponding to a plurality of first language simple sentences in a first language and a plurality of pieces of second language simple sentence data corresponding to a plurality of second language simple sentences in a second language, the first language simple sentence data and the second language simple sentence data being associated with each other so that the first language simple sentences and the second language simple sentences respectively make pairs; and performing a given machine translation process on the second language simple sentence data contained in the first-language-second-language bilingual data to generate a plurality of pieces of third language simple sentence data corresponding to a plurality of third language simple sentences in a third language, and associating the second language simple sentence data with the third language simple sentence data so that the second language simple sentences and the third language simple sentences respectively make pairs.

BRIEF DESCRIPTION OF THE SEVERAL VIEWS OF THE DRAWING

FIG. 3 shows a table illustrative of bilingual data.
FIG. 5 shows a list illustrative of bilingual data.

DETAILED DESCRIPTION OF THE EMBODIMENT

Figure 1:
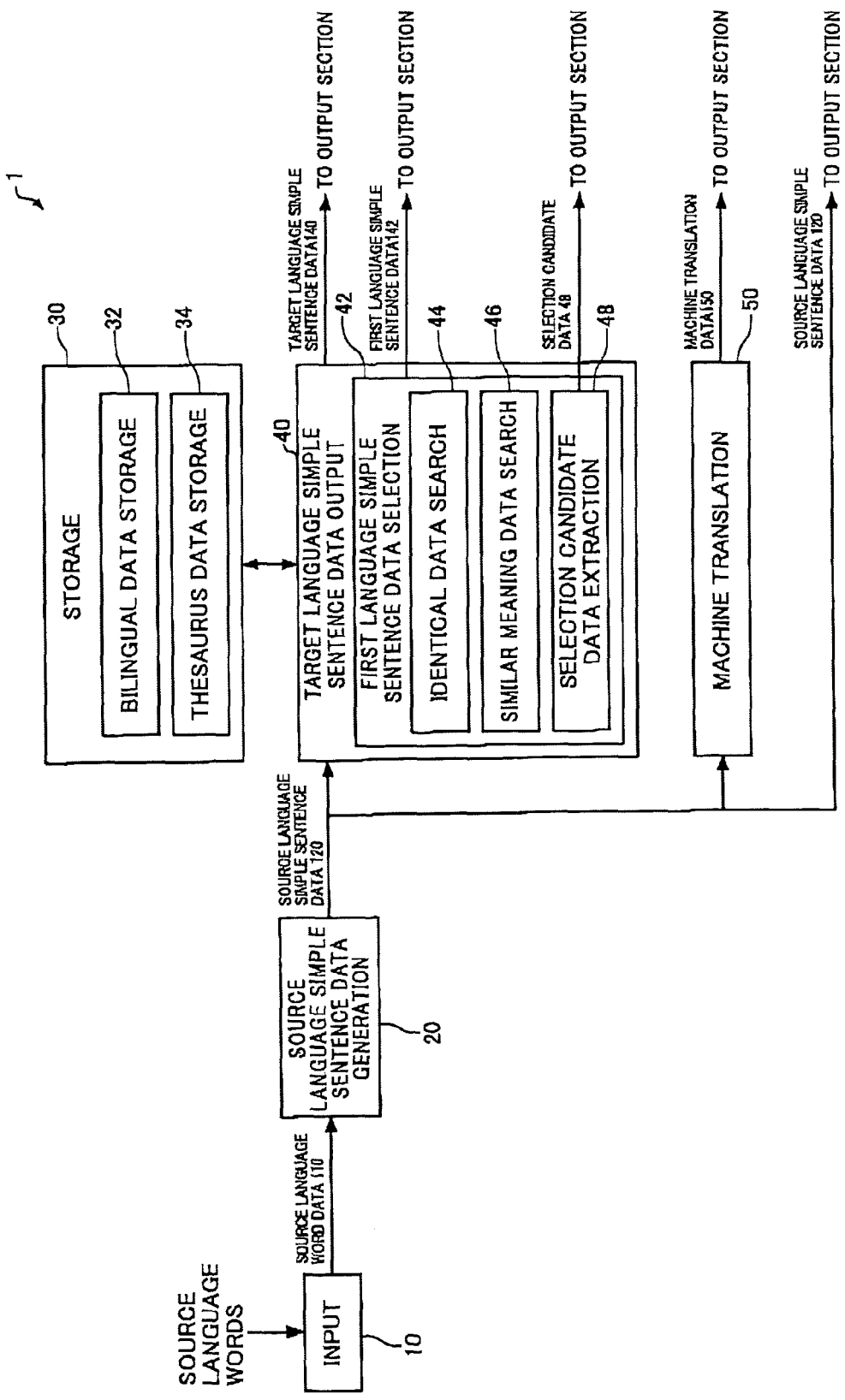
FIG. 1 is a view illustrative of a translation system.

The invention may provide a translation system which reduces processing load and achieves high translation accuracy, a translation program, and a bilingual data generation method.

(1) According to one embodiment of the invention, there is provided a translation system comprising:

a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence, the target language simple sentence data output section receiving first-language-source-language simple sentence data corresponding to a first-language-source-language simple sentence in the first language, and selecting first language simple sentence data from the plurality of pieces of the first language simple sentence data stored in the bilingual data storage section based on the received first-language-source-language simple sentence data; and the target language simple sentence data output section outputting the second language simple sentence data associated with the selected first language simple sentence data as the target language simple sentence data.

The translation system according to this embodiment receives source language words in simple sentence units, and outputs translated words in simple sentence units. Specifically, the translation system according to this embodiment performs a translation process in simple sentence units. The term "simple sentence" is generally defined as "a sentence containing only one clause". On the other hand, the term "simple sentence" according to this embodiment includes a concept broader than the above definition. According to this embodiment, the term "simple sentence" may be defined as "a group of words having a meaning". According to this embodiment, since the translation process is performed in units of words having a meaning, the intention of the user can be accurately translated.

The translation system according to this embodiment performs the translation process in simple sentence units based on the target language simple sentence data in which the first language simple sentence data is associated with the second language simple sentence data. According to this embodiment, the source language can be accurately translated in simple sentence units.

The translation system according to this embodiment selects first language simple sentence data from the first language simple sentence data stored in the bilingual data storage section, and outputs second language simple sentence data associated with the selected first language simple sentence data as the target language simple sentence data. Therefore, the target language simple sentence data can be output with a reduced processing load.

Moreover, the translation system according to this embodiment outputs second language simple sentence data provided in advance and stored in the bilingual data storage section as the target language simple sentence data (translated word data). This enables a translation of the source language to be output using natural words (words without a wrong impression), whereby smooth communication can be implemented.

According to this embodiment, a translation system can be provided which can implement a translation process that accurately reflects the intention of the user with a reduced processing load.

(2) In this translation system,
the target language simple sentence data output section may determine whether or not first language simple sentence data which coincides with the first-language-source-language simple sentence data is stored in the bilingual data storage section referring to the bilingual data storage section; and when the target language simple sentence data output section has determined that first language simple sentence data which coincides with the first-language-source-language simple sentence data is stored in the bilingual data storage section, the target language simple sentence data output section may select the first language simple sentence data which coincides with the first-language-source-language simple sentence data.

According to this configuration, first language simple sentence data which indicates the source language (source language simple sentence) input by the user is selected from the first language simple sentence data stored in the bilingual data storage section. Since the bilingual data storage section stores second language simple sentence data associated with the selected first language simple sentence data, target language word data corresponding to target language words into which the source language words are accurately translated can be output by outputting the second language simple sentence data.

According to this embodiment, a highly accurate translation system can be provided.

(3) In this translation system,
the target language simple sentence data output section may determine whether or not first language simple sentence data corresponding to a first language simple sentence having a meaning similar to that of the first-language-source-language simple sentence is stored in the bilingual data storage section referring to the bilingual data storage section; and when the target language simple sentence data output section has determined that first language simple sentence data corresponding to a first language simple sentence having a meaning similar to that of the first-language-source-language simple sentence is stored in the bilingual data storage section, the target language simple sentence data output section may select the first language simple sentence data corresponding to the first language simple sentence having a meaning similar to that of the first-language-source-language simple sentence.

According to this configuration, first language simple sentence data which indicates a meaning similar to that of the source language (source language simple sentence) input by the user is selected from the first language simple sentence data stored in the bilingual data storage section. Since the bilingual data storage section stores second language simple sentence data associated with the selected first language simple sentence data, target language word data corresponding to target language words having a meaning similar to that of the source language words can be output by outputting the second language simple sentence data.

According to this embodiment, a highly accurate translation system can be provided.

(4) This translation system may further comprise:
a thesaurus data storage section which stores thesaurus data in the first language, wherein the target language simple sentence data output section determines whether or not first language simple sentence data corresponding to a first language simple sentence having a meaning similar to that of the first-language-source-language simple sentence is stored in the bilingual data storage section based on the thesaurus data.

(5) This translation system may further comprise:

a selection candidate data extraction section which extracts first language simple sentence data which satisfies a given selection candidate condition from the plurality of pieces of first language simple sentence data stored in the bilingual data storage section as selection candidate data, the translation system causing a given output device to output a first language simple sentence corresponding to the first language simple sentence data extracted as the selection candidate data based on the selection candidate data extracted by the selection candidate data extraction section.

According to this configuration, since the selection candidate data can be presented to the user, the user can select one piece of the selection candidate data. Therefore, first language simple sentence data corresponding to the first language simple sentence corresponding to the intention of the user can be selected.

(6) In this translation system, the target language simple sentence data output section may select first language simple sentence data from the first language simple sentence data extracted as the selection candidate data based on selection information which selects first language simple sentence data from the first language simple sentence data extracted as the selection candidate data.

The selection information may be information which is input by the user and selects one piece of the selection candidate data. According to this configuration, since first language simple sentence data corresponding to the first language simple sentence corresponding to the intention of the user can be selected, a highly accurate translation system can be provided.

(7) This translation system may further comprise:

a selected simple sentence output section which causes a given output device to output a first language simple sentence corresponding to the first language simple sentence data selected by the target language simple sentence data output section.

According to this configuration, the user can determine words recognized by the translation system as source language words. Therefore, a translation process corresponding to the intention of the user can be achieved.

(8) In this translation system, the first language simple sentence data may be stored in the bilingual data storage section while being classified into a plurality of groups; and one piece of the first language simple sentence data classified into each of the groups may be designated as representative data.

(9) In this translation system, the target language simple sentence data output section may select one piece of the first language simple sentence data designated as the representative data.

This enables translated words in general expression to be output, whereby the intention of the user is easily expressed.

(10) In this translation system, the second language simple sentence data may be stored in the bilingual data storage section while being classified into a plurality of groups; and one piece of the second language simple sentence data classified into each of the groups may be designated as representative data.

(11) In this translation system, the target language simple sentence data output section may output one piece of the second language simple sentence data designated as the representative data as the target language simple sentence data.

This enables translated words in general expression to be output, whereby the intention of the user is easily expressed.

(12) In this translation system, the target language simple sentence data output section may receive second-language-source-language simple sentence data corresponding to a second-language-source-language simple sentence in the second language, and select second language simple sentence data from the second language simple sentence data stored in the bilingual data storage section based on the received second-language-source-language simple sentence data; and the target language simple sentence data output section may output the first language simple sentence data associated with the selected second language simple sentence data as the target language simple sentence data.

According to this embodiment, the process of translating the first language into the second language and the process of translating the second language into the first language are performed based on one piece of bilingual data Specifically, one piece of bilingual data is shared by two translation systems. Therefore, a bidirectional translation process can be implemented with a small amount of data.

(13) This translation system may further comprise:

a target language simple sentence output section which causes a given output device to output the target language simple sentence based on the target language simple sentence data.

(14) This translation system may further comprise:

an output unit determination section which determines an output unit of the target language simple sentence based on an external signal, wherein the target language simple sentence output section causes a plurality of target language simple sentences corresponding to a plurality of pieces of target language simple sentence data to be successively output based on the output unit determined by the output unit determination section.

(15) This translation system may further comprise:

a second bilingual data storage section, the plurality of pieces of second language simple sentence data and a plurality of pieces of third language simple sentence data corresponding to a plurality of third language simple sentences in a third language being stored in the second bilingual data storage section while being associated with each other so that the second language simple sentences and the third language simple sentences respectively make pairs; and a second target language simple sentence data output section which receives the second language simple sentence data output from the target language simple sentence data output section as the target language simple sentence data, refers to the second bilingual data storage section, and outputs the third language simple sentence data associated with the received second language simple sentence data as second target language simple sentence data.

According to this embodiment, words in the first language are translated into words in the third language utilizing the bilingual data (first bilingual data) in which the first language simple sentence data is associated with the second language simple sentence data and the second bilingual data in which the second language simple sentence data is associated with the third language simple sentence data. According to this embodiment, the first language simple sentence is translated into the third language simple sentence through the second language simple sentence (second language simple sentence data). Therefore, a translation process between the first language and the third language can be implemented without providing bilingual data in which the first language simple sentence data is directly associated with the third language simple sentence data According to this embodiment, a translation system can be provided which can accurately implement multilingual translation which translates one language into several languages with a small amount of bilingual data.

In this embodiment, the second language simple sentence data contained in the first bilingual data may be the same as the second language simple sentence data contained in the second bilingual data. According to this configuration, since the first language simple sentence data and the third language simple sentence data can be associated with each other so that the corresponding simple sentences make pairs, source language words in the first language can be accurately translated into words in the third language. The second language may be referred to as a bridge language.

(16) This translation system may further comprise:

a second target language simple sentence output section which causes a given output device to output a second target language simple sentence corresponding to the second target language simple sentence data based on the second target language simple sentence data.

(17) This translation system may further comprise:

a source language simple sentence output section which causes a given output device to output the source language simple sentence based on the source language simple sentence data.

(18) This translation system may further comprise:

a machine translation section which determines whether or not the source language simple sentence data satisfies a given machine translation condition, and performs a given machine translation process on the source language simple sentence data when the source language simple sentence data satisfies the machine translation condition.

(19) This translation system may further comprise:

a source language simple sentence data output section which outputs the source language simple sentence data based on source language word data which is input externally and indicates source language words, wherein the source language simple sentence data output section determines whether or not the source language words form a simple sentence, and outputs the source language word data as the source language simple sentence data when the source language words form a simple sentence;

wherein, when the source language words do not form a simple sentence, the source language simple sentence data output section analyzes the source language word data, generates data corresponding to a simple sentence having the same meaning as that of the source language words, and outputs the generated data as the source language simple sentence data; and wherein the target language simple sentence data output section outputs the target language simple sentence data based on the source language simple sentence data output from the source language simple sentence data output section.

(20) In this translation system, the source language simple sentence data output section may acquire the source language word data through a network.

(21) In this translation system, the target language simple sentence data output section may acquire the source language simple sentence data through a network.

(22) According to one embodiment of the invention, there is provided a translation program causing a computer to function as:

a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence, the target language simple sentence data output section receiving first-language-source-language simple sentence data corresponding to the first-language-source-language simple sentence in the first language, and selecting first language simple sentence data from the plurality of pieces of the first language simple sentence data stored in the bilingual data storage section based on the received first-language-source-language simple sentence data; and the target language simple sentence data output section outputting the second language simple sentence data associated with the selected first language simple sentence data as the target language simple sentence data.

The program according to this embodiment receives source language words in simple sentence units, and outputs translated words in simple sentence units. Specifically, the program according to this embodiment performs a translation process in simple sentence units. The program according to this embodiment performs the translation process in simple sentence unit based on the target language simple sentence data in which the first language simple sentence data is associated with the second language simple sentence data. According to this embodiment, the translation process can be accurately performed in units of a group of words having a meaning.

According to this embodiment, first language simple sentence data is selected from the first language simple sentence data stored in the bilingual data storage section, and the second language simple sentence data associated with the selected first language simple sentence data is output as the target language simple sentence data. Therefore, the target language simple sentence data can be output with a reduced processing load.

According to this embodiment, a program can be provided which can implement a highly accurate translation process that reflects the intention of the user with a reduced processing load.

(23) According to one embodiment of the invention, there is provided a bilingual data generation method comprising:

providing first-language-second-language bilingual data, the first-language-second-language bilingual data including a plurality of pieces of first language simple sentence data corresponding to a plurality of first language simple sentences in a first language and a plurality of pieces of second language simple sentence data corresponding to a plurality of second language simple sentences in a second language, the first language simple sentence data and the second language simple sentence data being associated with each other so that the first language simple sentences and the second language simple sentences respectively make pairs; and performing a given machine translation process on the second language simple sentence data contained in the first-language-second-language bilingual data to generate a plurality of pieces of third language simple sentence data corresponding to a plurality of third language simple sentences in a third language, and associating the second language simple sentence data with the third language simple sentence data so that the second language simple sentences and the third language simple sentences respectively make pairs.

According to this configuration, bilingual data which can implement multilingual translation can be efficiently generated. In particular, bilingual data which can implement highly accurate multilingual translation can be generated by generating a plurality of pieces of bilingual data so that the second language simple sentence data (bridge language simple sentence data) is identical.

Some embodiments of the invention will be described below, with reference to the drawings. Note that the invention is not limited to the following embodiments. The invention includes configuration in which the elements in the following embodiments and modifications are arbitrarily combined.

1. First Embodiment

A translation system 1 according to a first embodiment of the invention is described below. The translation system 1 is configured as a translation apparatus which receives source language words in a first language (e.g., Japanese), and outputs target language words in a second language (i.e., a language other than the first language: e.g., English). FIGS. 1 to 4 arc views illustrative of the translation system 1.

1.1 Configuration of Translation System 1

The configuration of the translation system 1 is described below with reference to FIGS. 1 to 3.

Figure 2:
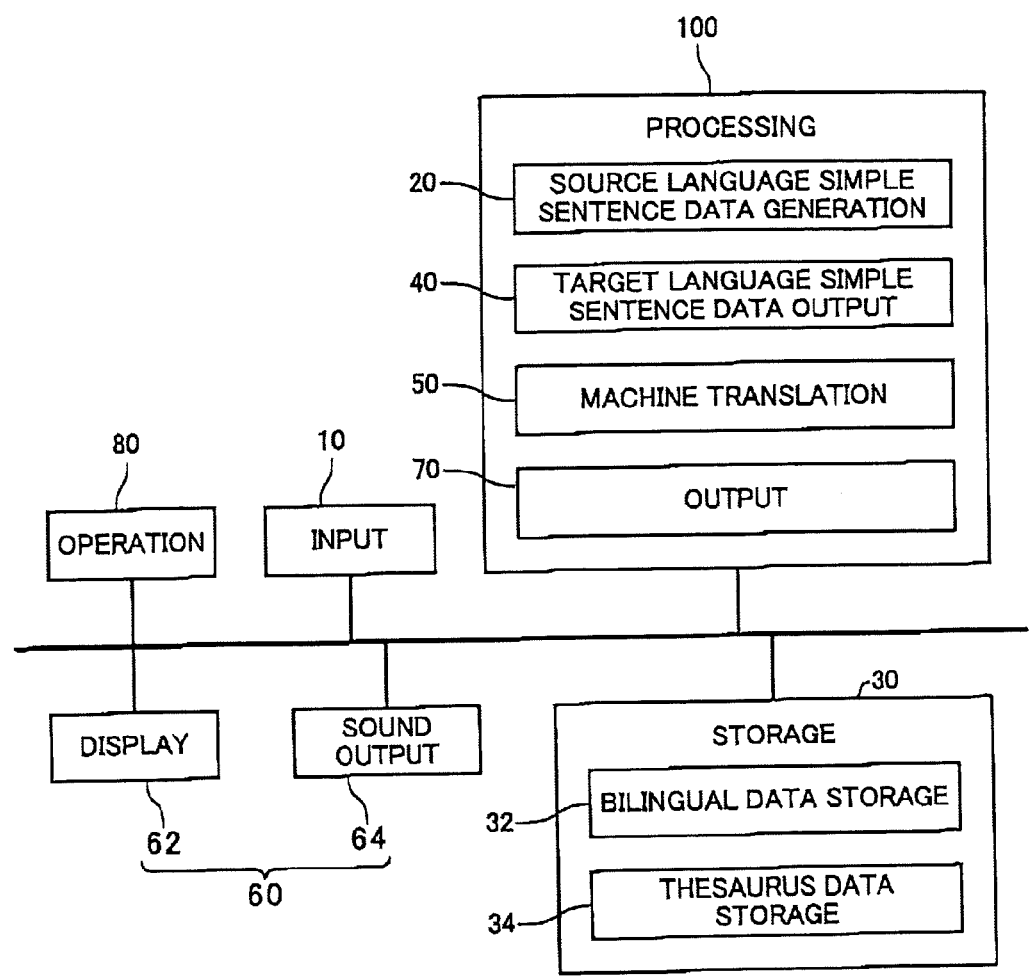
FIG. 2 is another view illustrative of a translation system.

As shown in FIGS. 1 and 2, the translation system 1 according to his embodiment includes an input section 10. The input section 10 allows the user to input given words (source language words). The term "source language words" used herein refers to words to be translated by the translation system 1 (translation apparatus). The input section 10 receives a source language word input operation of the user, and outputs a source language word data 110 corresponding to the source language words.

The input section 10 which may be applied to the translation system 1 is not particularly limited. A known input device (user interface) may be applied. The input section 10 may allow the user to input source language words using characters. In this case, the input section 10 may be implemented by hardware such as a push button, an operation lever, or a touch panel. The input section 10 may allow the user to input source language words using a voice. In this case, the input section 10 may be implemented by a known microphone (voice input device).

As shown in FIGS. 1 and 2, the translation system 1 according to this embodiment includes a source language simple sentence data generation section 20. The source language simple sentence data generation section 20 receives the source language word data 110, and outputs source language simple sentence data 120. The source language simple sentence data 120 refers to data corresponding to a source language simple sentence (translation target language words that form a simple sentence).

The term "simple sentence" is generally defined as "a sentence containing only one clause". On the other hand, the term "simple sentence" used in the invention includes a concept broader than the above definition. For example, a subject (nominative case) may be omitted in Japanese. In the invention, a group of words from which the subject is omitted is also included in the term "simple sentence". A group of words which is grammatically classified as a complex sentence (sentence containing a main clause and a dependent clause) but is utilized as an idiomatic phrase may be included in the term "simple sentence". In the invention, the term "simple sentence" may be defined as "a group of words having a meaning".

The source language simple sentence data generation section 20 determines whether or not the source language words (words corresponding to the source language word data 110) form a simple sentence. In other words, the source language simple sentence data generation section 20 determines whether or not the source language words have one clause or a plurality of clauses (a group of words containing a plurality of simple sentences: complex sentence). The source language simple sentence data generation section 20 may determine whether or not the source language words form a simple sentence based on the source language word data 110.

When the source language words form a simple sentence, the source language simple sentence data generation section 20 outputs the source language word data 110 as the source language simple sentence data 120.

For example, when the source language simple sentence data generation section 20 has received the source language word data 110 corresponding to source language words (simple sentence) "(I) caught a cold", the source language simple sentence data generation section 20 outputs the source language word data 110 as the source language simple sentence data 120.

On the other hand, when the source language words do not form a simple sentence (when the source language words form a complex sentence: i.e., when the source language words contain a plurality of clauses), the source language simple sentence data generation section 20 generates data corresponding to a simple sentence (source language simple sentence) having the same meaning as the source language words based on the source language word data 110, and outputs the generated data as the source language simple sentence data 120. In this case, the source language simple sentence data generation section 20 outputs one or more pieces of source language simple sentence data 120 based on the source language word data 110. When the source language words can be converted into one simple sentence, the source language simple sentence data generation section 20 outputs one piece of source language simple sentence data 120 corresponding to the simple sentence. When the source language words can be converted (decomposed) into a plurality of simple sentences the source language simple sentence data generation section 20 outputs a plurality of pieces of source language simple sentence data 120 corresponding to the simple sentences.

For example, when the source language simple sentence data generation section 20 has received the source language word data corresponding to source language words (complex sentence) "Since I caught a cold, please give me medicine", the source language simple sentence data generation section 20 outputs the source language simple sentence data 120 corresponding to the simple sentence "(I) caught a cold" and the source language simple sentence data 120 corresponding to the simple sentence "please give me a medicine". In this example, the source language simple sentence data generation section 20 decomposes one piece of source language word data 110 into two (a plurality of pieces of source language simple sentence data 120. Specifically, the source language simple sentence data generation section 20 decomposes the source language word data 110 so that a plurality of simple sentences represented by a plurality of pieces of source language simple sentence data 120 have the same meaning as the source language words in combination. When the source language words can be converted into one simple sentence, the source language simple sentence data generation section 20 may output one piece of source language simple sentence data 120.

In the translation system 1 according to this embodiment, a known method (e.g., JP-A-4-54670 or Makoto Nagao and four others, *Gengojohoshori [Language Information Processing]* (Iwanami Shoten Publishers, Dec. 3, 2004. 112-113)) may be applied to the source language simple sentence data generation section 20.

As shown in FIGS. 1 and 2, the translation system 1 according to this embodiment includes a bilingual data storage section 32. A plurality of pieces of first language simple sentence data corresponding to a plurality of first language simple sentences in the first language and a plurality of pieces of second language simple sentence data corresponding to a plurality of second language simple sentences in the second language are stored in the bilingual data storage section 32 while being associated with each other so that the first language simple sentences and the second language simple sentences respectively make pairs. The data stored in the bilingual data storage section 32 may be referred to as bilingual data (first-language-second-language bilingual data). In this case, the bilingual data stored in the bilingual data storage section 32 includes a plurality of pieces of first language simple sentence data corresponding to a plurality of first language simple sentences in the first language and a plurality of pieces of second language simple sentence data corresponding to a plurality of second language simple sentences in the second language, wherein the first language simple sentence data and the second language simple sentence data are associated with each other so that the first language simple sentences and the second language simple sentences respectively make pairs.

FIG. 3 shows an example of the simple sentences (first language simple sentences and second language simple sentences) stored in the bilingual data storage section 32. In this embodiment, the first language simple sentence and the second language simple sentence are associated with each other to make a pair, as shown in FIG. 3. The first language simple sentence data corresponding to the first language simple sentence shown in FIG. 3 and the second language simple sentence data corresponding to the second language simple sentence shown in FIG. 3 are stored in the bilingual data storage section 32 while being associated with each other. In this embodiment, the first language simple sentence data and the second language simple sentence data may be text data using an ASCII code or a JIS code.

In this embodiment, the bilingual data storage section 32 may be a storage device provided in the main body of the translation apparatus. Alternatively, the bilingual data storage section 32 may be implemented by an information storage medium removable from the main body of the translation apparatus.

As shown in FIGS. 1 and 2, the translation system 1 according to this embodiment may include a thesaurus data storage section 34. The thesaurus data storage section 34 is a storage device which stores thesaurus data in the first language. The thesaurus data storage section 34 may be a storage device provided in the main body of the translation apparatus, or may be implemented by an information storage medium removable from the main body of the translation apparatus.

The term "thesaurus data in the first language" used herein refers to data in which various words in the first language are classified and arranged in terms of meaning. The thesaurus data in the first language may be data in which nouns, verbs, adjectives, adverbs, and particles are classified in terms of meaning.

As shown in FIGS. 1 and 2, the translation system 1 according to this embodiment includes a target language simple sentence data output section 40. The target language simple sentence data output section 40 outputs target language simple sentence data 140 corresponding to a target language simple sentence translated from a source language simple sentence based on the source language simple sentence data 120 corresponding to a given source language simple sentence. The target language simple sentence data output section 40 selects first language simple sentence data from the first language simple sentence data stored in the bilingual data storage section 32 based on the source language simple sentence data 120, and outputs second language simple sentence data associated with the selected first language simple sentence data as the target language simple sentence data. The target language simple sentence data output section 40 is described in detail below.

As shown in FIG. 1, the target language simple sentence data output section 40 includes a first language simple sentence data selection section 42. The first language simple sentence data selection section 42 selects first language simple sentence data from the first language simple sentence data stored in the bilingual data storage section 32 based on the first-language-source-language simple sentence data (source language simple sentence data 120) which indicates the source language simple sentence in the first language. The first language simple sentence data selected by the first language simple sentence data selection section 42 may be referred to as selected simple sentence data 142.

In this embodiment, the first language simple sentence data selection section 42 may include an identical data search section 44, as shown in FIG. 1. The identical data search section 44 refers to the bilingual data storage section 32, and determines whether or not data (identical data) which coincides with the first-language-source-language simple sentence data is stored in the bilingual data storage section 32. When data (identical data) which coincides with the first-language-source-language simple sentence data is stored in the bilingual data storage section 32, the first language simple sentence data selection section 42 selects the corresponding first language simple sentence data.

In this embodiment, the first language simple sentence data selection section 42 may include a similar meaning data search section 46, as shown in FIG. 1. The similar meaning data search section 46 refers to the bilingual data storage section 32, and determines whether or not first language simple sentence data (similar data) corresponding to a first language simple sentence having a meaning similar to that of the first-language-source-language simple sentence is stored in the bilingual data storage section 32. When first language simple sentence data (similar data) corresponding to a first language simple sentence having a meaning similar to that of the first-language-source-language simple sentence is stored in the bilingual data storage section 32, the first language simple sentence data selection section 42 selects the similar data.

For example, when a first-language-source-language simple sentence "Do you have white shirts?" has been input, the similar meaning data search section 46 may determine the first language simple sentence data corresponding to the first language simple sentence "Do you have shirts?" stored in the bilingual data storage section 32 to be the similar data When a first-language-source-language simple sentence "Can I wear this one?" has been input, the similar meaning data search section 46 may determine the first language simple sentence data corresponding to the first language simple sentence "Can I try this one?" stored in the bilingual data storage section 32 to be the similar data. When a first-language-source-language simple sentence "I would like to use this card" has been input, the similar meaning data search section 46 may determine the first language simple sentence data corresponding to the first language simple sentence "Can I use this card?" stored in the bilingual data storage section 32 to be the similar data.

The similar meaning data search section 46 may determine whether or not similar data is stored in the bilingual data storage section 32 based on the thesaurus data (synonym data in the first language) stored in the thesaurus data storage section 34. Whether or not a first language simple sentence corresponding to a given first language simple sentence data stored in the bilingual data storage section 32 is similar to the first-language-source-language simple sentence may be determined by comparing the given first language simple sentence data with the first-language-source-language simple sentence data, extracting the identical point and the difference between the given first language simple sentence data and the first-language-source-language simple sentence data, and determining whether or not the difference can be replaced by another expression based on the thesaurus data, for example.

In this embodiment, the target language simple sentence data output section 40 (translation system 1) may include a selection candidate data extraction section 48, as shown in FIG. 1. The selection candidate data extraction section 48 extracts data which satisfies a given selection candidate condition from the first language simple sentence data stored in the bilingual data storage section 32 as selection candidate data 148. For example, the selection candidate data extraction section 48 may calculate the degree of similarity between the source language simple sentence data 120 and the first language simple sentence data stored in the bilingual data storage section 32, and extract the first language simple sentence data of which the degree of similarity with the source language simple sentence data 120 exceeds a given value as the selection candidate data 148. Alternatively, when the selection candidate data extraction section 48 has determined that a plurality of pieces of first language simple sentence data corresponding to the first language simple sentence having a meaning similar to that of the source language simple sentence are stored in the bilingual data storage section 32, the selection candidate data extraction section 48 may extract the first language simple sentence data corresponding to the first language simple sentence having a meaning similar to that of the source language simple sentence as the selection candidate data 148.

When the translation system 1 includes the selection candidate data extraction section 48, the first language simple sentence data selection section 42 may select first language simple sentence data from the first language simple sentence data extracted as the selection candidate data 148 based on selection information input externally. In the translation system 1 according to this embodiment, the selection information may be information input by the user through an operation section 80 described later. For example, the selection candidate simple sentences corresponding to the selection candidate data may be displayed on a display section 62, first language simple sentence data may be selected from the first language simple sentence data extracted as the selection candidate data based on information which is input by the user through the operation section 890 who selects one of the selection candidate simple sentences displayed on the display section 62.

In the translation system 1 according to this embodiment, the target language simple sentence data output section 40 outputs the target language simple sentence data 140 based on the first language simple sentence data (selected simple sentence data 142) selected by the first language simple sentence data selection section 42. Specifically, the target language simple sentence data output section 40 outputs the second language simple sentence data stored in the bilingual data storage section 32 and associated with the selected simple sentence data 142 as the target language simple sentence data 140. The first language simple sentence data and the second language simple sentence data are stored in the bilingual data storage section 32 while being associated with each other, as described above. Therefore, when one piece of first language simple sentence data has been selected, the second language simple sentence data associated with the selected first language simple sentence can be easily specified. Since the first language simple sentence data and the second language simple sentence data are associated with each other so that the first language simple sentences and the second language simple sentences respectively make pairs, the second language simple sentence data corresponding to the selected first language simple sentence data can be considered to be data which indicates a translation of the source language simple sentence.

As shown in FIGS. 1 and 2, the translation system 1 according to this embodiment may include a machine translation section 50. The machine translation section 50 determines whether or not the source language simple sentence data 120 satisfies a given machine translation condition, and performs a given machine translation process on the source language simple sentence data 120 which satisfies the machine translation condition. The machine translation section 50 may determine that the source language simple sentence data 120 satisfies the machine translation condition when the source language simple sentence data 120 does not coincide with the data stored in the bilingual data storage section 32 and the first language simple sentence data corresponding to the first language simple sentence having a similar meaning is not stored in the bilingual data storage section 32, and perform the machine translation process on the source language simple sentence data 120. The machine translation section 50 may be configured to perform the machine translation process on the source language simple sentence data 120 and output machine translation data 150. The machine translation section 50 which can be applied to this embodiment is not particularly limited. A known machine translation means may be used.

As shown in FIGS. 1 and 2, the translation system 1 according to this embodiment may include an output device 60. The output device 60 may include a display section 62 or a sound output section 64, for example. The display section 62 may be implemented by hardware such as a CRT display, an LCD, an OELD, a PDP, or a touch panel display. The sound output section 64 may be implemented by hardware such as a speaker or a headphone.

As shown in FIG. 2, the translation system 1 may include an output section 70. The output section 70 causes the output device 60 to output given words. When the output device 60 is a display device, the output section 70 causes the display section 62 to display given words. When the output device 60 is a sound output device, the output section 70 causes the sound output section 64 to output given words.

The output section 70 may cause a target language simple sentence to be output based on the target language simple sentence data 140. Specifically, the output section 70 may be configured as a target language simple sentence output section The target language simple sentence data 140 is the second language simple sentence data provided in advance.

Therefore, natural words (words without a wrong impression) can be output by outputting the target language simple sentence based on the target language simple sentence data 140.

The translation system 1 according to this embodiment may include an output unit determination section (not shown). The output unit determination section determines the output unit of the target language simple sentence data 140 for the output section 70. The output unit determination section may determine the output unit of the target language simple sentence data 140 based on an external signal (e.g., trigger signal). The output section 70 may successively output a plurality of pieces of target language simple sentence data 140 based on the output unit determined by the output unit determination section.

The output section 70 may cause one target language simple sentence to be output each time one piece of target language simple sentence data 140 is output from the target language simple sentence data output section 40. Alternatively, the output section 70 may cause a plurality of pieces of target language simple sentence data 140 to be successively output as one output unit. For example, the output section 70 may store a plurality of pieces of target language simple sentence data 140 in the storage section 30, receive a target output trigger signal input externally, and causes a plurality of pieces of target language simple sentence data 140 stored in the storage section 30 to be successively output as data which forms one output unit. This enables consistent simple sentences to be successively output, whereby smooth communication can be implemented.

The output section 70 may cause the first language simple sentence (selected simple sentence) corresponding to the selected simple sentence data 142 to be output based on the first language simple sentence data (selected simple sentence data 142) selected by the first language simple sentence data selection section 42. Specifically, the output section 70 may be configured as a selected simple sentence output section. The output section 70 may cause a source language simple sentence to be output based on the source language simple sentence data 120. Specifically, the output section 70 may be configured as a source language simple sentence output section. The output section 70 may cause machine-translated words to be output based on the machine translation data 150. Specifically, the output section 70 may be configured as a machine-translated word output section. The output section 70 may cause the first language simple sentence (selected simple sentence) corresponding to the selection candidate data 148 to be output based on the first language simple sentence data (selection candidate data 148) extracted by the selection candidate data extraction section 48.

The output section 70 may cause the output device 60 (display device 62) to display an image in addition to words. For example, the output device 60 may detect that the source language simple sentence data or the target language simple sentence data contains data indicating the word "medicine", and cause an image of a medicine to be displayed. The output device 60 may acquire image data through a network, for example, and display an image on the display section 62 based on the acquired image data.

As shown in FIG. 1, the translation system 1 according to this embodiment may include the operation section 80. The operating section 80 allows the user to input operation data. The function of the operating section 80 may be implemented by an operation button, an operation lever, a touch panel, or the like. The operation section 80 may be a device to which information which designates the first language (source language) and the second language (target language) is input.

The operation section 80 may be a device for inputting the target output trigger signal. The operation section 80 may be a device for inputting the selection signal which selects one of the output candidate simple sentences.

In the translation system 1 according to this embodiment, the source language simple sentence data generation section 20 and the target language simple sentence data output section 40 may be configured as a processing section 100. The processing section 100 may perform various processes using the storage section (storage section 30) as a work area to implement various functions. The functions (e.g., source language simple sentence data generation function and target language simple sentence data output function) of the processing section 100 may be implemented by causing a processor (e.g., CPU or DSP) to execute various programs. Note that the functions of the processing section 100 may be implemented by a dedicated hardware circuit.

The translation system 1 according to this embodiment may be configured as described above.

1.2 Operation of Translation System 1

Figure 4:
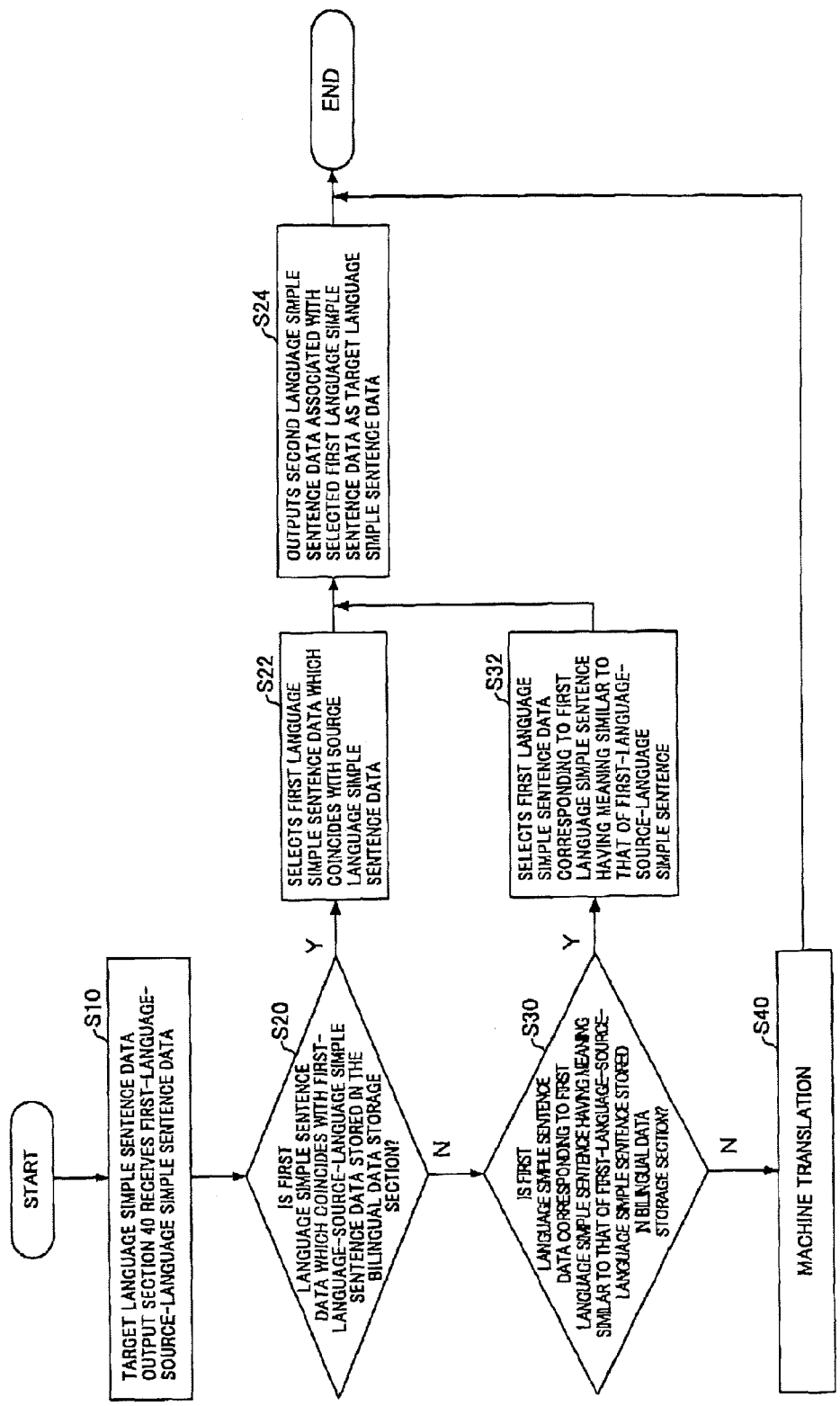
FIG. 4 is a flowchart illustrative of the operation of a translation system.

The operation of the translation system 1 according to this embodiment is described below. FIG. 4 is a flowchart illustrative of the operation of the translation system 1.

The target language simple sentence data output section 40 receives the source language simple sentence data 120 (first-language-source-language simple sentence data) (step S10).

The target language simple sentence data output section 40 determines whether or not first language simple sentence data which coincides with the first-language-source-language simple sentence data received by the target language simple sentence data output section 40 is stored in the bilingual data storage section 32 (step S20).

When first language simple sentence data which coincides with the first-language-source-language simple sentence data received by the target language simple sentence data output section 40 is stored in the bilingual data storage section 32 (Yes in step S20), the target language simple sentence data output section 40 selects the first language simple sentence data which coincides with the source language simple sentence data (step S22).

The target language simple sentence data output section 40 outputs second language simple sentence data stored in the bilingual data storage section 32 and associated with the selected first language simple sentence data as the target language simple sentence data (step S24).

When first language simple sentence data which coincides with the first-language-source-language simple sentence data received by the target language simple sentence data output section 40 is not stored in the bilingual data storage section 32 (No in step S20), the target language simple sentence data output section 40 determines whether or not first language simple sentence data corresponding to the first language simple sentence having a meaning similar to that of the first-language-source-language simple sentence is stored in the bilingual data storage section 32 (step S30).

When first language simple sentence data corresponding to the first language simple sentence having a meaning similar to that of the first-language-source-language simple sentence is stored in the bilingual data storage section 32 (Yes in step S30), the target language simple sentence data output section 40 selects the first language simple sentence data corresponding to the first language simple sentence having a meaning similar to that of the fit-language-source-language simple sentence (step S32).

The target language simple sentence data output section 40 outputs second language simple sentence data stored in the bilingual data storage section 32 and associated with the selected first language simple sentence data as the target language simple sentence data (step S24).

When first language simple sentence data corresponding to the first language simple sentence having a meaning similar to that of the first-language-source-language simple sentence is not stored in the bilingual data storage section 32 (No in step S30), the machine ration section 50 performs the given machine translation process on the language simple sentence data (first language simple sentence data) (step S40).

1.3 Effects of Translation System 1

The effects of the translation system 1 are given below.

The translation system 1 according to this embodiment receives source language words in simple sentence units, and outputs translated words in simple sentence units. Specifically, the translation system 1 performs the translation process in simple sentence units. Since the term "simple sentence" refers to "a group of words having one meaning (clause)", the translation system 1 according to this embodiment performs the translation process in units of a group of words having one meaning (clause). According to the translation system 1, a highly accurate translation system can be implemented which can output translated words which accurately reflect the intention of the user.

The translation system 1 according to this embodiment selects first language simple sentence data from the first language simple sentence data stored in the bilingual data storage section 32, and outputs second language simple sentence data associated with the selected first language simple sentence data as the target language simple sentence data. Therefore, the target language simple sentence data can be output with a reduced processing load.

According to this embodiment, the first language simple sentence data and the second language simple sentence data are stored in the bilingual data storage section 32 while being associated with each other so that the first language simple sentences and the second language simple sentences respectively make pairs (have the same meaning). Therefore, if the first language simple sentence data selection section 42 can select the first language simple sentence data having the same meaning as the source language simple sentence from the first language simple sentence data stored in the bilingual data storage section 32, the second language simple sentence data corresponding to the source language simple sentence can be output.

In the translation system 1 according to this embodiment, the first language simple sentence data selection section 42 determines whether or not first language simple sentence data which coincides with the source language simple sentence data is stored in the bilingual data storage section 32. When first language simple sentence data which coincides with the source language simple sentence data is stored in the bilingual data storage section 32, the first language simple sentence data selection section 42 selects the first language simple sentence data, and outputs second language simple sentence data associated with the selected first language simple sentence data. According to this configuration, second language simple sentence data corresponding to the second language simple sentence which is a translation of the source language simple sentence can be output. This enables translated words (translated words associated with the source language words) having the same meaning as the source language words to be output, whereby a highly accurate translation can be implemented.

In the translation system 1 according to this embodiment, when first language simple sentence data which coincides with the source language simple sentence data is not stored in the bilingual data storage section 32, the first language simple sentence data selection section 42 determines whether or not first language simple sentence data corresponding to the first language simple sentence having a meaning similar to that of the source language simple sentence is stored in the bilingual data storage section 32. When first language simple sentence data corresponding to the first language simple sentence having a meaning similar to that of the source language simple sentence is stored in the bilingual data storage section 32, the first language simple sentence data selection section 42 selects the first language simple sentence data, and outputs second language simple sentence data associated with the selected first language simple sentence data. According to this configuration, second language simple sentence data corresponding to the second language simple sentence which is a translation of the first language simple sentence having a meaning similar to that of the source language simple sentence can be output. This enables translated words having a meaning similar to that of the source language words to be output, whereby highly accurate translated words can be output.

In the translation system 1 according to this embodiment the first language simple sentence data selection section 42 includes the machine translation section 50. According to this configuration, translated words can be output even if data which coincides with the source language simple sentence data and first language simple sentence data corresponding to the first language simple sentence having a meaning similar to that of the source language simple sentence are not stored in the bilingual data storage section 32. According to this embodiment, data subjected to the machine translation process of the machine translation section 50 is data corresponding to a simple sentence (source language simple sentence data 120). Therefore, a highly accurate translation process can be implemented even when applying a known machine translation method.

1.4 Modification

The invention is not limited to the above-described embodiments, and various modifications can be made. For example, the invention includes various other configurations substantially the same as the configurations described in the embodiments (in function, method and result, or in objective and result, for example). The invention also includes a configuration in which an unsubstantial portion in the described embodiments is replaced The invention also includes a configuration having the same effects as the configurations described in the embodiments, or a configuration able to achieve the same objective. Further, the invention includes a configuration in which a publicly known technique is added to the configurations in the embodiments.

Specific modifications are given below.

1.4.1 First Modification

FIG. 5 shows a list illustrative of a translation system according to a first modification of this embodiment.

In the first modification, the first language simple sentence data is stored in the bilingual data storage section 32, while being classified into a plurality of groups. In the first modification, first language simple sentence data corresponding to the first language simple sentences having similar meanings may be classified as one group. In the first modification, one piece of the first language simple sentence data classified into each group is designated as representative data.

In the first modification, second language simple sentence data is stored in the bilingual data storage section 32 while being classified into a plurality of groups. In the first modification, second language simple sentence data corresponding to second language simple sentences having similar meanings may be classified as one group. In the first modification, one piece of the second language simple sentence data classified into each group is designated as representative data.

FIG. 5 shows an example of grouped bilingual data stored in the bilingual data storage section 32. In FIG. 5, the first language simple sentence 500 and the second language simple sentence 510 are designated as representative data in the first group. Data having (almost) the same meaning as the representative data is classified as one group. In the second group, the first language simple sentence 520 in that language and the second language simple sentence 530 are designated as representative data Data having the same meaning as the representative data is classified as one group.

In the first modification, the first language simple sentence data selection section 42 may select one piece of the first language simple sentence data designated as the representative data. Specifically, the first language simple sentence data selection section 42 may detect the group to which the received source language simple sentence data belongs, and select the first language simple sentence data designated as representative data of the detected group.

More specifically, when receiving source language simple sentence data 502, for example, the first language simple sentence data selection section 42 detects that the received source language simple sentence data belongs to the first group, and selects the source language simple sentence data 500 from the bilingual data shown in FIG. 5.

The target language simple sentence data output section 40 may output the second language simple sentence data associated with the representative data contained in the first language simple sentence data as the target language simple sentence data.

According to this configuration, since translated words which can be more easily understood by a third person can be output by designating a general simple sentence as the representative data, smoother communication can be implemented.

However, if translated words are always output utilizing the representative data, the nuance of the words may not be expressed even if the intention of the user is roughly expressed. Therefore, the translation system according to the first modification may be configured so that the operation mode can be switched. Specifically, the translation system according to the first modification may be configured so that the operation mode can be switched between a representative data mode in which the representative data is selected and a normal mode in which the representative data is not used. According to this configuration, translated words appropriate for the application can be output. For example, the operation mode may be switched based on a mode switching signal input by the user through the operation section 80.

1.4.2 Second Modification

Figure 6:
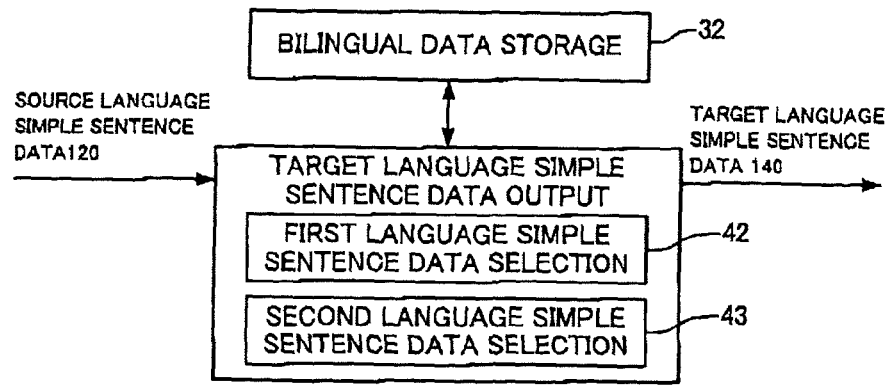
FIG. 6 is another view illustrative of a translation system.

FIG. 6 is a view illustrative of a translation system according to a second modification of this embodiment.

In the second modification, the target language simple sentence data output section 40 includes a second language simple sentence data selection section 43. The second language simple sentence data selection section 43 receives second-language-source-language simple sentence data corresponding to a second-language-source-language simple sentence in the second language, and selects second language simple sentence data from the second language simple sentence data stored in the bilingual data storage section 32 based on the received second-language-source-language simple sentence data.

The target language simple sentence data output section 40 outputs first language simple sentence data associated with the second language simple sentence data selected by the second language simple sentence data selection section 43 as the target language simple sentence data.

In the second modification, the target language simple sentence data output section 40 translates source language words in the first language into words in the second language and translates source language words in the second language into words in the first language utilizing the bilingual data stored in the bilingual data storage section 32. Specifically, the bilingual data stored in the bilingual data storage section 32 can be shared by two translation processes. Therefore, the memory capacity necessary for the translation apparatus can be reduced.

2. Second Embodiment

Figure 7:
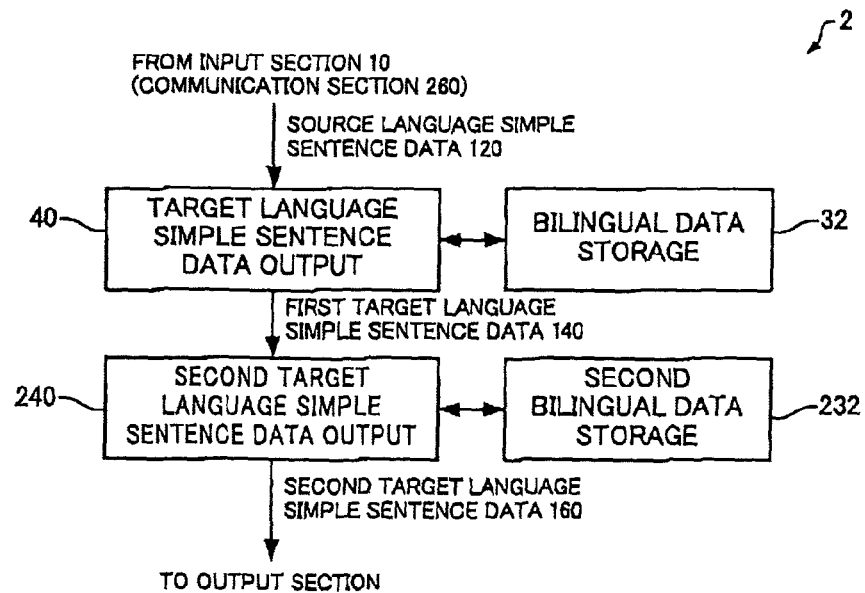
FIG. 7 is another view illustrative of a translation system.
Figure 8:
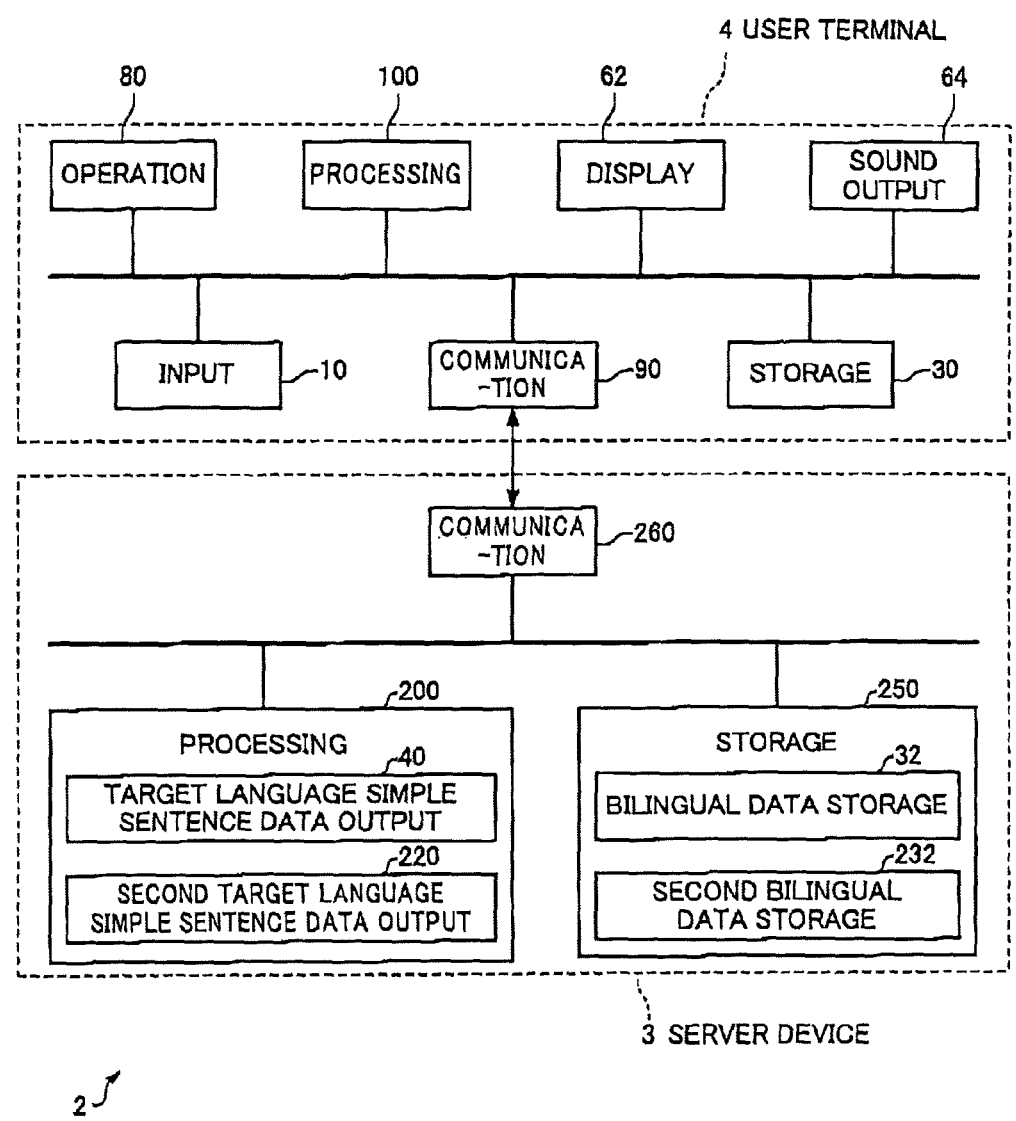
FIG. 8 is a further view illustrative of a translation system.
Figure 9:
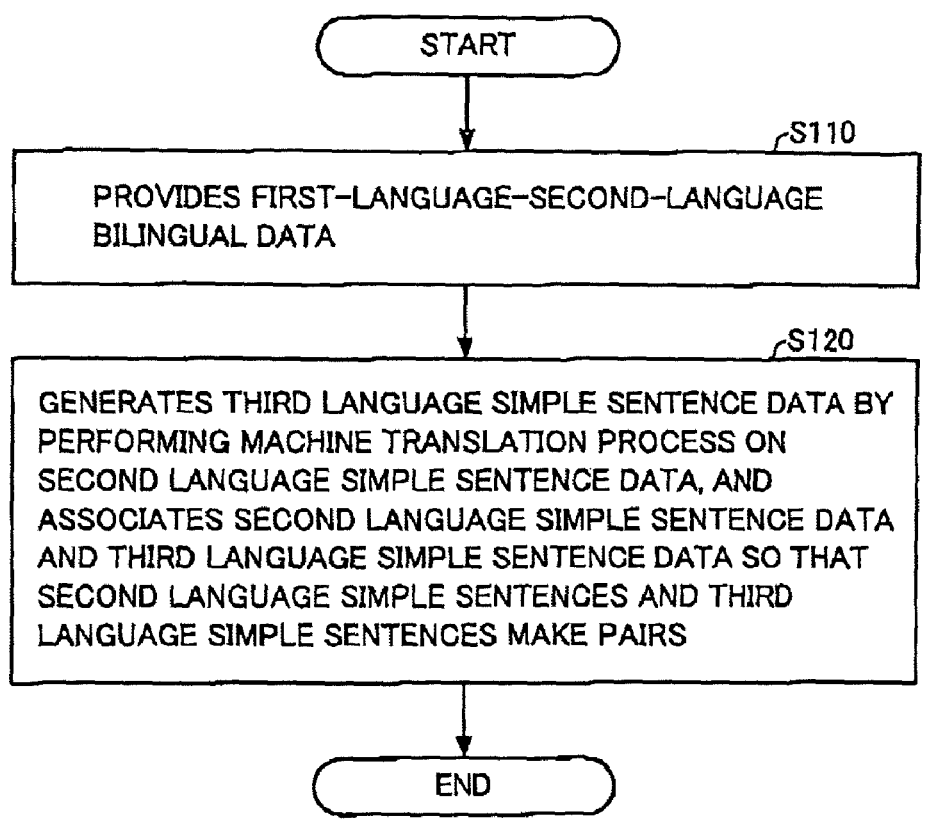
FIG. 9 is a flowchart illustrative of a bilingual data generation method.

A second embodiment of the invention is described below. FIGS. 7 to 9 are views illustrative of a translation system 2 according to the second embodiment of the invention.

The translation system 2 according to this embodiment includes a bilingual data storage section 32 and a target language simple sentence data output section 40.

As shown in FIGS. 7 and 8, the translation system 2 according to this embodiment includes a second bilingual data storage section 232. A plurality of pieces of second language simple sentence data corresponding to a plurality of second language simple sentences in the second language and a plurality of pieces of third language simple sentence data corresponding to a plurality of third language simple sentences in a third language are stored in the second bilingual data storage section 232 while being associated with each other so that the second language simple sentences and the third language simple sentences make pairs. In this embodiment, the data stored in the second bilingual data storage section 232 may be referred to as second bilingual data (second language-third language bilingual data). In this case, the second bilingual data includes a plurality of pieces of second language simple sentence data corresponding to a plurality of second language simple sentences in the second language and a plurality of pieces of third language simple sentence data corresponding to a plurality of third language simple sentences in the third language, wherein the second language simple sentence data and the third language simple sentence data are associated with each other so that the second language simple sentences and the third language simple sentences make pairs. The second language simple sentence data contained in the second bilingual data may be the same as the second language simple sentence data contained in the first-language-second-language bilingual data.

As shown in FIGS. 7 and 8, the translation system 2 according to this embodiment includes a second target language simple sentence data output section 240. The second target language simple sentence data output section 240 receives the second language simple sentence data output from the target language simple sentence data output section 40 as the target language simple sentence data 140, refers to the second bilingual data storage section 232, and outputs third language simple sentence data associated with the received second language simple sentence data as the second target language simple sentence data.

In the translation system 2 according to this embodiment, the target language simple sentence data 140 output from the target language simple sentence data output section 40 is the second language simple sentence data stored in the bilingual data storage section 32. The same data as the second language simple sentence data stored in the bilingual data storage section 32 is stored in the second bilingual data storage section 232. Specifically, the same data as the target language simple sentence data 140 (second language simple sentence data) output from the target language simple sentence data output section 40 is stored in the second bilingual data storage section 232, and the data (third language simple sentence data) associated with the target language simple sentence data 140 (second language simple sentence data) is stored in the second bilingual data storage section 232. Therefore, second target language simple sentence data 160 in the third language corresponding to a second target language simple sentence which is a translation of the source language simple sentence can be specified by detecting the same second language simple sentence data as the target language simple sentence data 140 referring to the second bilingual data storage section 232, and specifying the third language simple sentence data associated with the detected second language simple sentence data.

The output section 70 causes the output device 60 to output the second target language simple sentence based on the second target language simple sentence data 160. Specifically, the output section 70 may be configured as a second target language simple sentence output section.

As shown in FIG. 8, the translation system 2 may include a server device 3 and a user terminal 4. The server device 3 and the user terminal 4 respectively include a communication section 260 and a communication section 90 for communication. The translation system 2 may be configured so that a processing section 200 (the target language simple sentence data output section 40 and the second target language simple sentence data output section 240) is included in the server device 3, and the target language simple sentence data output section 40 acquires the source language simple sentence data 120 through the communication section 260. In other words, the target language simple sentence data output section 40 may be configured to acquire the source language simple sentence data 120 through a network. Specifically, the source language simple sentence data 120 received by the target language simple sentence data output section 40 may be data input through a network. The source language simple sentence data generation section 20 may be implemented by the server device 3 or the user terminal 4. When the source language simple sentence data generation section 20 is implemented by the server device 3, the source language word data 110 received by the source language simple sentence data generation section 20 is data input through a network.

The server device 3 includes a storage section 250. The storage section 250 may be hardware which serves as a work area for the processing section 200. In this embodiment, the bilingual data storage section 32 and the second bilingual data storage section 232 may be included in the storage section 250.

The translation system 2 according to this embodiment may be configured as described above. According to the translation system 2, a translation system can be provided which can accurately translate words (first-language-source-language simple sentence) in the first language into words (third language target language simple sentence) in the third language.

According to this embodiment, a translation process between the first language and the third language is implemented through the second language (bridge language). This makes it possible to reduce the amount of bilingual data necessary for implementing multilingual translation which translates words in one language into words in a plurality of languages. The effects obtained by this embodiment are described below.

For example, when performing the translation process between the first language, the second language, and the third language, three pieces of bilingual data are required to perform the translation process between the three languages. Specifically, bilingual data in which first language simple sentence data is associated with second language simple sentence data, bilingual data in which second language simple sentence data is associated with third language simple sentence data, and bilingual data in which third language simple sentence data is associated with first language simple sentence data are required. Therefore, $N \times (N-1)/2$ pieces of bilingual data are necessary in order to implement translation between N languages.

According to this embodiment, when performing the translation process through one language (second language), translation between three languages can be implemented using two pieces of bilingual data. Specifically, when performing the translation process through one language (bridge language: English, for example), translation between N languages can be implemented by providing $(N-1)$ pieces of bilingual data. According to this embodiment, a translation system which requires a small amount of bilingual data can be provided.

According to this embodiment, the second bilingual data (data in which the second language simple sentence data is associated with the third language simple sentence data) may be generated utilizing the bilingual data (data in which the first language simple sentence data is associated with the second language simple sentence data) which has been generated. A method of generating the second bilingual data is as follows. FIG. 9 is a flowchart illusive of the method of generating the second bilingual data.

Bilingual data (first-language-second-language bilingual data) is provided in which the first language simple sentence data and the second language simple sentence data are associated with each other so that the first language simple sentences and the second language simple sentences respectively make pairs (step S110).

A plurality of pieces of third language simple sentence data corresponding to a plurality of third language simple sentences in the third language are generated by performing the machine translation process on the second language simple sentence data contained in the bilingual data, and the second language simple sentence data and the third language simple sentence data are associated with each other so that the second language simple sentences and the third language simple sentences make pairs (step S120).

The second bilingual data can be thus generated.

Machine translation technology between a specific language (particularly English) and other languages (e.g., Japanese, Korean, Chinese, French, German, and Russian) has been increasingly developed. Therefore, simple sentence data corresponding to a simple sentence in a language other than English can be efficiently generated by performing a given machine translation process on simple sentence data which indicates a simple sentence in English.

According to this method, bilingual data can be generated so that bridge language simple sentence data (second language simple sentence data) is identical. Therefore, bilingual data which can implement highly accurate multilingual translation can be generated efficiently, whereby a highly accurate multilingual translation system can be implemented.

Figure 10:
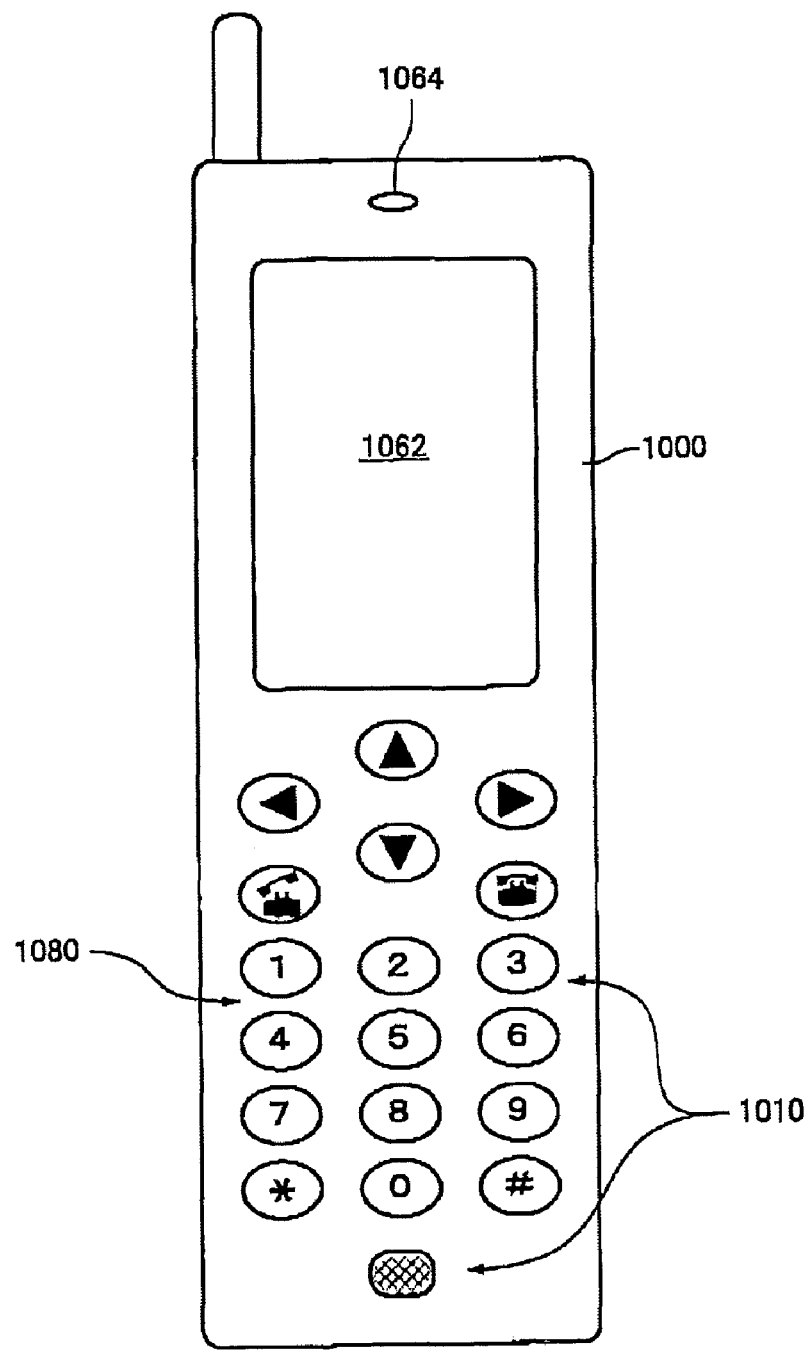
FIG. 10 is a view illustrative of an example of a user terminal.

FIG. 10 shows a portable telephone 1000 as an example of an electronic instrument which may be applied to the user terminal 4 of the translation system 2. The portable telephone 1000 includes an input section 1010 implemented by push buttons and a microphone. The portable telephone 1000 includes an operation section 1080 implemented by push buttons. The portable telephone 1000 includes a display section 1062 implemented by a display panel and a sound output section 1064 implemented by a speaker.

Although only some embodiments of his invention have been described in detail above, those skilled in the art will readily appreciate that many modifications are possible in the embodiments without materially departing from the novel teachings and advantages of this invention. Accordingly all such modifications are intended to be included within the scope of the invention.

What is claimed is:

1. A translation system comprising:
   a storage device;
   a processor;
   a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and
   a target language simple sentence data output section which outputs target language simple sentence data corresponding to a target language simple sentence which is a translation of a given source language simple sentence based on source language simple sentence data corresponding to the source language simple sentence,
   the target language simple sentence data output section receiving first-language-source-language simple sentence data corresponding to a first-language-source-language simple sentence in the first language, and selecting first language simple sentence data from the plurality of pieces of the first language simple sentence data stored in the bilingual data storage section based on the received first-language-source-language simple sentence data; and
   the target language simple sentence data output section outputting the second language simple sentence data associated with the selected first language simple sentence data as the target language simple sentence data;
   wherein the first language simple sentence data is stored in the bilingual data storage section while being classified into a plurality of groups;
   wherein one piece of the first language simple sentence data classified into each of the groups is designated as representative data; and
   wherein the target language simple sentence data output section selects one piece of the first language simple sentence data designated as the representative data.

2. The translation system as defined in claim 1, further comprising:
   a thesaurus data storage section which stores thesaurus data in the first language,
   wherein the target language simple sentence data output section determines whether or not first language simple sentence data which coincides with the first-language-source-language simple sentence data is stored in the bilingual data storage section referring to the bilingual data storage section;
   wherein, when the target language simple sentence data output section has determined that first language simple sentence data which coincides with the first-language-source-language simple sentence data is stored in the bilingual data storage section, the target language simple sentence data output section selects the first language simple sentence data which coincides with the first-language-source-language simple sentence data;
   wherein the target language simple sentence data output section determines whether or not first language simple sentence data corresponding to a first language simple sentence having a meaning similar to that of the first-language-source-language simple sentence is stored in the bilingual data storage section referring to the bilingual data storage section;
   wherein, when the target language simple sentence data output section has determined that first language simple sentence data corresponding to a first language simple sentence having a meaning similar to that of the first-language-source-language simple sentence is stored in the bilingual data storage section, the target language simple sentence data output section selects the first language simple sentence data corresponding to the first language simple sentence having a meaning similar to that of the first-language-source-language simple sentence; and
   wherein the target language simple sentence data output section determines whether or not first language simple sentence data corresponding to a first language simple sentence having a meaning similar to that of the first-language-source-language simple sentence is stored in the bilingual data storage section based on the thesaurus data.

3. The translation system as defined in claim 1, further comprising:
   a selection candidate data extraction section which extracts first language simple sentence data which satisfies a given selection candidate condition from the plurality of pieces of first language simple sentence data stored in the bilingual data storage section as selection candidate data,
   the translation system causing a given output device to output a first language simple sentence corresponding to the first language simple sentence data extracted as the selection candidate data based on the selection candidate data extracted by the selection candidate data extraction section; and
   wherein the target language simple sentence data output section selects first language simple sentence data from the first language simple sentence data extracted as the selection candidate data based on selection information which selects first language simple sentence data from the first language simple sentence data extracted as the selection candidate data.

4. The translation system as defined in claim 1, further comprising:
   a selected simple sentence output section which causes a given output device to output a first language simple sentence corresponding to the first language simple sentence data selected by the target language simple sentence data output section.

5. The translation system as defined in claim 1,
   wherein the target language simple sentence data output section receives second-language-source-language simple sentence data corresponding to a second-language-source-language simple sentence in the second language, and selects second language simple sentence data from the second language simple sentence data stored in the bilingual data storage section based on the received second-language-source-language simple sentence data; and
   wherein the target language simple sentence data output section outputs the first language simple sentence data associated with the selected second language simple sentence data as the target language simple sentence data.

6. The translation system as defined in claim 1, further comprising:
a target language simple sentence output section which causes a given output device to output the target language simple sentence based on the target language simple sentence data; and
an output unit determination section which determines an output unit of the target language simple sentence based on an external signal,
wherein the target language simple sentence output section causes a plurality of target language simple sentences corresponding to a plurality of pieces of target language simple sentence data to be successively output based on the output unit determined by the output unit determination section.

7. The translation system as defined in claim 1, further comprising:
a second bilingual data storage section, the plurality of pieces of second language simple sentence data and a plurality of pieces of third language simple sentence data corresponding to a plurality of third language simple sentences in a third language being stored in the second bilingual data storage section while being associated with each other so that the second language simple sentences and the third language simple sentences respectively make pairs;
a second target language simple sentence data output section which receives the second language simple sentence data output from the target language simple sentence data output section as the target language simple sentence data, refers to the second bilingual data storage section, and outputs the third language simple sentence data associated with the received second language simple sentence data as second target language simple sentence data; and
a second target language simple sentence output section which causes a given output device to output a second target language simple sentence based on the second target language simple sentence data.

8. The translation system as defined in claim 1, further comprising:
a machine translation section which determines whether or not the source language simple sentence data satisfies a given machine translation condition, and performs a given machine translation process on the source language simple sentence data when the source language simple sentence data satisfies the machine translation condition.

9. The translation system as defined in claim 1, further comprising:
a source language simple sentence data output section which outputs the source language simple sentence data based on source language word data which is input externally and indicates source language words,
wherein the source language simple sentence data output section determines whether or not the source language words form a simple sentence, and outputs the source language word data as the source language simple sentence data when the source language words form a simple sentence;
wherein, when the source language words do not form a simple sentence, the source language simple sentence data output section analyzes the source language word data, generates data corresponding to a simple sentence having the same meaning as that of the source language words, and outputs the generated data as the source language simple sentence data; and
wherein the target language simple sentence data output section outputs the target language simple sentence data based on the source language simple sentence data output from the source language simple sentence data output section.

10. The translation system as defined in claim 1, wherein the target language simple sentence data output section acquires the source language simple sentence data through a network.

11. The translation system as defined in claim 1, wherein the second language simple sentence data is stored in the bilingual data storage section while being classified into a plurality of groups;
wherein one piece of the second language simple sentence data classified into each of the groups is designated as representative data; and
wherein the target language simple sentence data output section outputs one piece of the second language simple sentence data designated as the representative data as the target language simple sentence data.

12. A non-transitory information storage medium storing a computer program for causing a computer to function as:
a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and
a target language simple sentence data output section which outputs target language simple sentence data corresponding to a target language simple sentence which is a translation of a given source language simple sentence based on source language simple sentence data corresponding to the source language simple sentence,
the target language simple sentence data output section receiving first-language-source-language simple sentence data corresponding to the first-language-source-language simple sentence in the first language, and selecting first language simple sentence data from the plurality of pieces of the first language simple sentence data stored in the bilingual data storage section based on the received first-language-source-language simple sentence data; and
the target language simple sentence data output section outputting the second language simple sentence data associated with the selected first language simple sentence data as the target language simple sentence data;
wherein the first language simple sentence data is stored in the bilingual data storage section while being classified into a plurality of groups;
wherein one piece of the first language simple sentence data classified into each of the groups is designated as representative data; and
wherein the target language simple sentence data output section selects one piece of the first language simple sentence data designated as the representative data.

13. A translation system comprising:
a storage device;
a processor;

a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and a target language simple sentence data output section which outputs target language simple sentence data corresponding to a target language simple sentence which is a translation of a given source language simple sentence based on source language simple sentence data corresponding to the source language simple sentence, the target language simple sentence data output section receiving first-language-source-language simple sentence data corresponding to a first-language-source-language simple sentence in the first language, and selecting first language simple sentence data from the plurality of pieces of the first language simple sentence data stored in the bilingual data storage section based on the received first-language-source-language simple sentence data; and the target language simple sentence data output section outputting the second language simple sentence data associated with the selected first language simple sentence data as the target language simple sentence data;

wherein the second language simple sentence data is stored in the bilingual data storage section while being classified into a plurality of groups;

wherein one piece of the second language simple sentence data classified into each of the groups is designated as representative data; and wherein the target language simple sentence data output section outputs one piece of the second language simple sentence data designated as the representative data as the target language simple sentence data.

14. The translation system as defined in claim 13, further comprising:

a thesaurus data storage section which stores thesaurus data in the first language, wherein the target language simple sentence data output section determines whether or not first language simple sentence data which coincides with the first-language-source-language simple sentence data is stored in the bilingual data storage section referring to the bilingual data storage section;

wherein, when the target language simple sentence data output section has determined that first language simple sentence data which coincides with the first-language-source-language simple sentence data is stored in the bilingual data storage section, the target language simple sentence data output section selects the first language simple sentence data which coincides with the first-language-source-language simple sentence data;

wherein the target language simple sentence data output section determines whether or not first language simple sentence data corresponding to a first language simple sentence having a meaning similar to that of the first-language-source-language simple sentence is stored in the bilingual data storage section referring to the bilingual data storage section;

wherein, when the target language simple sentence data output section has determined that first language simple sentence data corresponding to a first language simple sentence having a meaning similar to that of the first-language-source-language simple sentence is stored in the bilingual data storage section, the target language simple sentence data output section selects the first language simple sentence data corresponding to the first language simple sentence having a meaning similar to that of the first-language-source-language simple sentence; and wherein the target language simple sentence data output section determines whether or not first language simple sentence data corresponding to a first language simple sentence having a meaning similar to that of the first-language-source-language simple sentence is stored in the bilingual data storage section based on the thesaurus data.

15. The translation system as defined in claim 13, further comprising:

a selection candidate data extraction section which extracts first language simple sentence data which satisfies a given selection candidate condition from the plurality of pieces of first language simple sentence data stored in the bilingual data storage section as selection candidate data, the translation system causing a given output device to output a first language simple sentence corresponding to the first language simple sentence data extracted as the selection candidate data based on the selection candidate data extracted by the selection candidate data extraction section; and wherein the target language simple sentence data output section selects first language simple sentence data from the first language simple sentence data extracted as the selection candidate data based on selection information which selects first language simple sentence data from the first language simple sentence data extracted as the selection candidate data.

16. The translation system as defined in claim 13, further comprising:

a selected simple sentence output section which causes a given output device to output a first language simple sentence corresponding to the first language simple sentence data selected by the target language simple sentence data output section.

17. The translation system as defined in claim 13, wherein the target language simple sentence data output section receives second-language-source-language simple sentence data corresponding to a second-language-source-language simple sentence in the second language, and selects second language simple sentence data from the second language simple sentence data stored in the bilingual data storage section based on the received second-language-source-language simple sentence data; and wherein the target language simple sentence data output section outputs the first language simple sentence data associated with the selected second language simple sentence data as the target language simple sentence data.

18. The translation system as defined in claim 13, further comprising:

a target language simple sentence output section which causes a given output device to output the target language simple sentence based on the target language simple sentence data; and an output unit determination section which determines an output unit of the target language simple sentence based on an external signal, wherein the target language simple sentence output section causes a plurality of target language simple sentences corresponding to a plurality of pieces of target language simple sentence data to be successively output based on the output unit determined by the output unit determination section.

19. The translation system as defined in claim 13, further comprising:
a second bilingual data storage section, the plurality of pieces of second language simple sentence data and a plurality of pieces of third language simple sentence data corresponding to a plurality of third language simple sentences in a third language being stored in the second bilingual data storage section while being associated with each other so that the second language simple sentences and the third language simple sentences respectively make pairs;
a second target language simple sentence data output section which receives the second language simple sentence data output from the target language simple sentence data output section as the target language simple sentence data, refers to the second bilingual data storage section, and outputs the third language simple sentence data associated with the received second language simple sentence data as second target language simple sentence data; and
a second target language simple sentence output section which causes a given output device to output a second target language simple sentence based on the second target language simple sentence data.

20. The translation system as defined in claim 13, further comprising:
a machine translation section which determines whether or not the source language simple sentence data satisfies a given machine translation condition, and performs a given machine translation process on the source language simple sentence data when the source language simple sentence data satisfies the machine translation condition.

21. The translation system as defined in claim 13, further comprising:
a source language simple sentence data output section which outputs the source language simple sentence data based on source language word data which is input externally and indicates source language words,
wherein the source language simple sentence data output section determines whether or not the source language words form a simple sentence, and outputs the source language word data as the source language simple sentence data when the source language words form a simple sentence;
wherein, when the source language words do not form a simple sentence, the source language simple sentence data output section analyzes the source language word data, generates data corresponding to a simple sentence having the same meaning as that of the source language words, and outputs the generated data as the source language simple sentence data; and
wherein the target language simple sentence data output section outputs the target language simple sentence data based on the source language simple sentence data output from the source language simple sentence data output section.

22. The translation system as defined in claim 13,
wherein the target language simple sentence data output section acquires the source language simple sentence data through a network.

23. A non-transitory information storage medium storing a program for causing a computer to function as:
a bilingual data storage section, a plurality of pieces of first language simple sentence data corresponding to a plurality of first language simple sentences in a first language and a plurality of pieces of second language simple sentence data corresponding to a plurality of second language simple sentences in a second language being stored in the bilingual data storage section while being associated with each other so that the first language simple sentences and the second language simple sentences respectively make pairs; and
a target language simple sentence data output section which outputs target language simple sentence data corresponding to a target language simple sentence which is a translation of a given source language simple sentence based on source language simple sentence data corresponding to the source language simple sentence,
the target language simple sentence data output section receiving first-language-source-language simple sentence data corresponding to the first-language-source-language simple sentence in the first language, and selecting first language simple sentence data from the plurality of pieces of the first language simple sentence data stored in the bilingual data storage section based on the received first-language-source-language simple sentence data; and
the target language simple sentence data output section outputting the second language simple sentence data associated with the selected first language simple sentence data as the target language simple sentence data;
wherein the second language simple sentence data is stored in the bilingual data storage section while being classified into a plurality of groups;
wherein one piece of the second language simple sentence data classified into each of the groups is designated as representative data; and
wherein the target language simple sentence data output section outputs one piece of the second language simple sentence data designated as the representative data as the target language simple sentence data.

* * * * *